(12) United States Patent
Susarla et al.

(10) Patent No.: US 8,196,128 B2
(45) Date of Patent: Jun. 5, 2012

(54) SYSTEM AND METHOD FOR PROVIDING A FILTERING CLASSLOADER IN A COMPUTER ENVIRONMENT

(75) Inventors: Srinagesh Susarla, Fremont, CA (US);
Ashok Banerjee, Fremont, CA (US);
Robert Woollen, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1325 days.

(21) Appl. No.: 11/765,263

(22) Filed: Jun. 19, 2007

(65) Prior Publication Data

US 2008/0271002 A1    Oct. 30, 2008

Related U.S. Application Data (60) Provisional application No. 60/914,846, filed on Apr. 30, 2007.

(51) Int. Cl.
*G06F 9/44* (2006.01)
(52) U.S. Cl. .................... 717/166; 717/162; 717/165
(58) Field of Classification Search .................. 717/166, 717/162, 165
See application file for complete search history.

(56) References Cited

U.S. PATENT DOCUMENTS

| | | | |
|---|---|---|---|
| 6,851,111 B2 * | 2/2005 | McGuire et al. | 717/166 |
| 6,901,589 B2 * | 5/2005 | White | 717/166 |
| 6,915,511 B2 * | 7/2005 | Susarla et al. | 717/166 |

OTHER PUBLICATIONS

Lee, et al. "Efficient Classloading Strategies for Interprocedural Analyses in the Presence of Dynamic Classloading", 2007, IEEE, p. 1-7.*

* cited by examiner

*Primary Examiner* — Qamrun Nahar
(74) *Attorney, Agent, or Firm* — Fliesler Meyer LLP

(57) ABSTRACT

A system and method for providing a filtering classloader within a Java-based or other application environment. In one embodiment, a filtering classloader is placed between two other classloaders, e.g. between the system classloader and the application classloader. The filtering classloader is provided with a set of patterns which throw a "class not found exception" if an application makes a request for that class or package. The exception leads the application classloader to believe (perhaps correctly) that there is no class with that name in the system classloader. The application classloader then loads the class itself. The class may or may not exist in the system classloader; the filtering classloader in essence overrides any retrieval from that classloader in favor of the application classloader, for certain specified patterns of request.

20 Claims, 11 Drawing Sheets

```
170
 weblogic-application.xml

172
  <prefer-application-packages>

174
      <package-name>org.apache.log4j.*</package-name>
      <package-name>antir.*</package-name>
   176
  </prefer-application-packages>
```

FIG. 21

SYSTEM AND METHOD FOR PROVIDING A FILTERING CLASSLOADER IN A COMPUTER ENVIRONMENT

CLAIM OF PRIORITY

This application claims priority from provisional application "SYSTEM AND METHOD FOR PROVIDING A FILTERING CLASSLOADER IN A COMPUTER ENVIRONMENT", Application No. 60/914,846, filed Apr. 30, 2007, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to Java-based and other application environments, and in particular to a system and method for providing a filtering classloader within such an environment.

BACKGROUND

As used in application servers, virtual machines and other type of computer servers, a classloader is a fundamental module of the Java language. The classloader runs as part of the Java virtual machine (JVM) to load software classes into the memory of the computer. The classloader is then responsible for finding and loading class files at run time in response to requests from applications.

Classloaders are typically deployed in a hierarchy with parent and child classloaders. The relationship between parent and child classloaders is analogous to the object relationship between superclasses and subclasses.

Within the classloader hierarchy, a bootstrap classloader provides the root of the Java hierarchy. The Java virtual machine (JVM) creates the bootstrap classloader, which loads the Java development kit (JDK) internal classes and java.* packages included in the JVM. (For example, the bootstrap classloader loads java.lang.String).

An extensions classloader is a child of the bootstrap classloader. The extensions classloader loads Java Archive (JAR) files placed in the extensions directory of the JDK, and allows for extending the JDK without adding entries to the classpath. Anything placed in the extensions directory is self-contained and can only refer to classes in the extensions directory or to JDK classes.

A system classpath classloader extends the extensions classloader. The system classpath classloader loads the classes from the classpath of the JVM. The term "system classloader" is used herein to differentiate this level of classloaders from other classloaders that are related to J2EE applications (which are referred to herein as "application classloaders"; it will be noted however that some other computer systems and environments refer to the system level classpath classloader as the application classloader).

A plurality of application-specific classloaders, or application classloaders are children of the system classpath classloader.

Classloaders use a delegation model when loading a class. In a typical implementation, the classloader implementation first checks its cache to see if the requested class has already been loaded. This class verification improves performance in that its cached memory copy can be used instead of repeated loading of the class from disk. If the class is not found in its cache, then the current classloader asks its parent in the hierarchy for that class. If the parent cannot load the class, then the classloader attempts to load the class. If a class exists in both the parent and the child classloaders, then the parent version is the one that is loaded. This delegation model is often followed to avoid multiple copies of the same form being loaded, which could lead to a ClassCastException.

Figure 1:
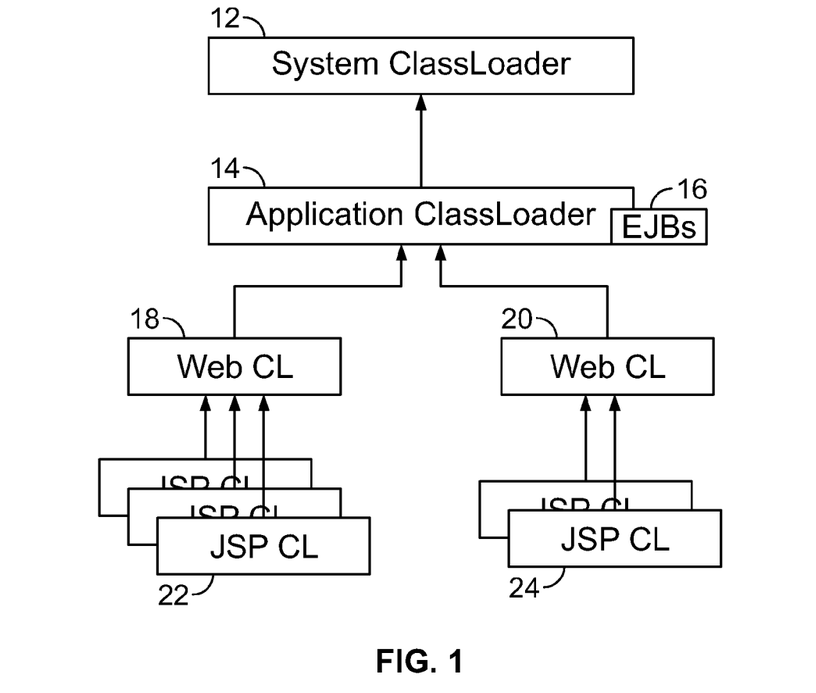
FIG. 1 shows an illustration of a classloader hierarchy as may be used in typical application servers.

Typically, the classloader hierarchy is defined in a configuration file for each application to be deployed to a server or application server. (For example, in WebLogic Server, the configuration information can be stored in a weblogic-application.xml file). The server reads the information in the configuration file and automatically creates the corresponding hierarchy of classloaders when the application is deployed. FIG. 1 shows a typical application classloading environment 10, including a system classloader 12 and an application classloader 14. The root classloader in this hierarchy can load any EJB JAR files 16 into the application. The server can also create a child classloader 18, 20 for each Web application WAR file. Since it is common for Web applications to call EJBs, the application classloader architecture typically allows JavaServer Page (JSP) files and servlets 22, 24 to see the EJB interfaces in their parent classloader. This also allows Web applications to be redeployed without redeploying the entire EJB tier.

However, while the typical classloader hierarchy does provide benefits, including e.g. allowing an application developer to used third-party JAR files such as ANTLR, Xerxes, SAML, and other proprietary and open source JARs, it also suffers from limitations. For example, it is not possible for the application developer to simultaneously use different versions of those JARs for different applications because the delegation model won't allow it. Furthermore, the Java 2 delegation model specifies that a classic loader must ask it's parent for a particular class before it tries to load that class itself. So for an application to load, e.g., a different copy of Xerxes, the application classloader must make a request to the system classloader first. The application can't load a version other than the Xerxes classloader specified at the system level.

SUMMARY

Disclosed herein is a system and method for providing a filtering classloader within a Java-based or other application environment. In one embodiment, a filtering classloader is placed between two other classloaders, e.g. between the system classloader and the application classloader. The filtering classloader is provided with a set of patterns which throw a "class not found exception" if an application makes a request for that class or package. The exception leads the application classloader to believe (perhaps correctly that there is no class with that name in the system classloader. The application classloader then loads the class itself. The class may or may not exist in the system classloader; the filtering classloader in essence overrides any retrieval from that classloader in favor of the application classloader, for certain specified patterns of request.

DETAILED DESCRIPTION

Disclosed herein is a system and method for providing a filtering classloader within a Java-based or other application environment. In one embodiment, a filtering classloader is placed between two other classloaders, e.g. between the system classloader and the application classloader. The filtering classloader is provided with a set of patterns which throw a "class not found exception" if an application makes a request for that class or package. The exception leads the application classloader to believe (perhaps correctly) that there is no class with that name in the system classloader. The application classloader then loads the class itself. The class may or may not exist in the system classloader; the filtering classloader in essence overrides any retrieval from that classloader in favor of the application classloader, for certain specified patterns of request.

As described above, classloaders are typically deployed in a hierarchy with parent and child classloaders. Within the classloader hierarchy, a bootstrap classloader provides the root of the Java hierarchy. An extensions classloader is a child of the bootstrap classloader. The extensions classloader loads Java Archive (JAR) files placed in the extensions directory of the JDK, and allows for extending the JDK without adding entries to the classpath. A system classpath classloader extends the extensions classloader. A plurality of application-specific classloaders, or application classloaders are children of the system classpath classloader.

Classloaders use a delegation model when loading a class. In a typical implementation, the classloader implementation first checks its cache to see if the requested class has already been loaded. This class verification improves performance in that its cached memory copy can be used instead of repeated loading of the class from disk. If the class is not found in its cache, then the current classloader asks its parent in the hierarchy for that class. However, while the typical classloader hierarchy does provide benefits, including e.g. allowing an application developer to used third-party JAR files such as ANTLR, Xerxes, SAML, and other proprietary and open source JARs, it also suffers from limitations. For example, it is not possible for the application developer to simultaneously use different versions of those JARs for different applications because the delegation model won't allow it. Furthermore, the Java 2 delegation model specifies that a classic loader must ask it's parent for a particular class before it tries to load that class itself. So for an application to load, e.g., a different copy of Xerxes, the application classloader must make a request to the system classloader first. The application can't load a version other than the Xerxes classloader specified at the system level.

Classloader Delegation Techniques

Figure 2:
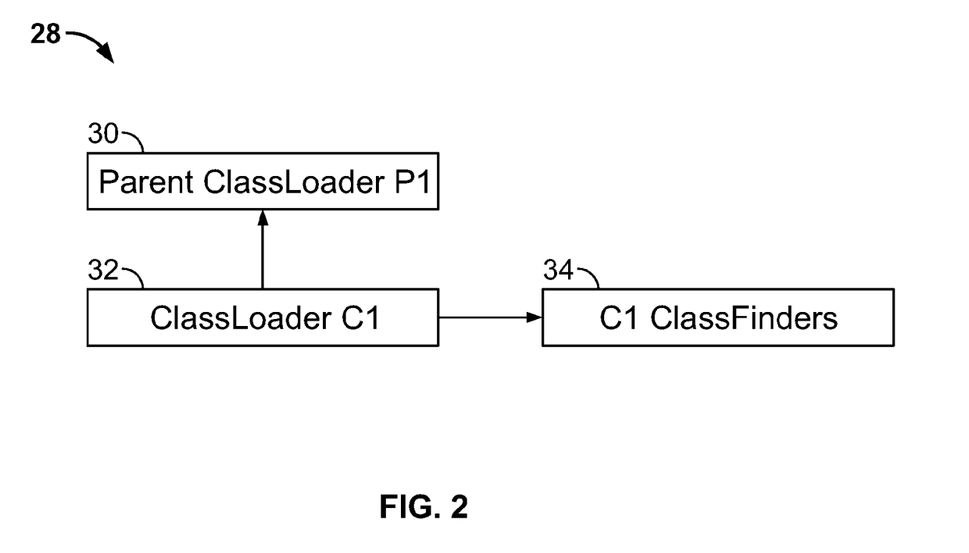
FIG. 2 shows an illustration of a classloader hierarchy which includes child-first delegation.
Figure 3:
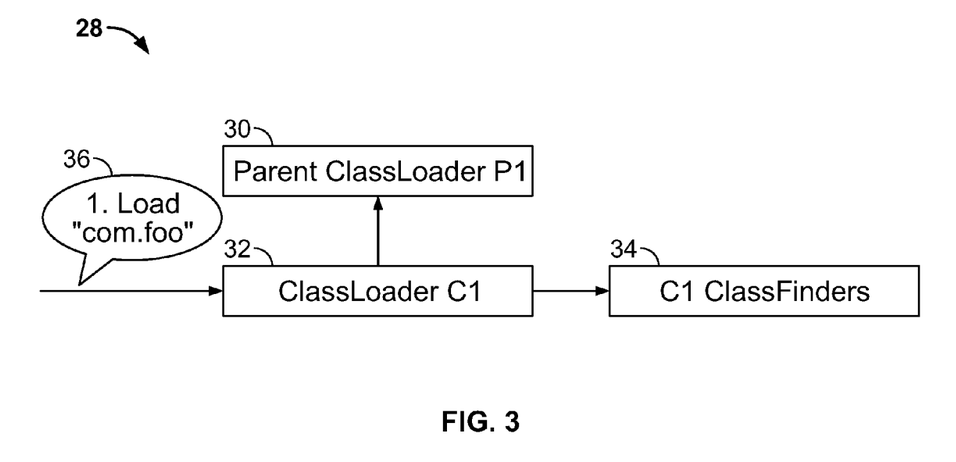
FIG. 3 shows another illustration of a classloader hierarchy which includes child-first delegation.
Figure 4:
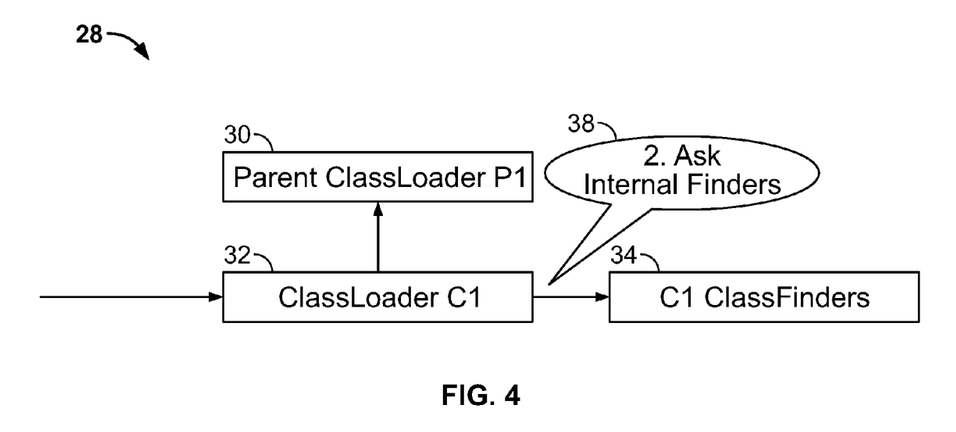
FIG. 4 shows another illustration of a classloader hierarchy which includes child-first delegation.
Figure 5:
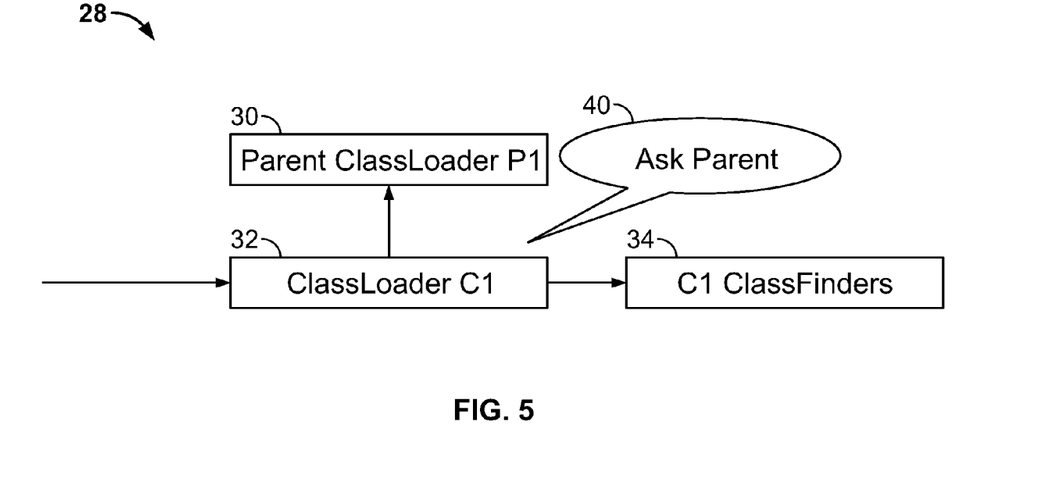
FIG. 5 shows another illustration of a classloader hierarchy which includes child-first delegation.

One technique that can be employed to address the above problems is to use a child-first delegation model. In a child-first delegation model, the application attempts to load needed classes and packages by requesting them from the application classloader first, and only then if it can't locate the requested class or package does it ask the parent classloader. FIGS. 2-5 show an illustration of a classloader hierarchy which includes child-first delegation. As shown in FIG. 2, the child-first delegation environment 28 includes a parent classloader 30 and a child classloader 32. In this example the child classloader includes classfinders 34. In FIG. 3, an application can make a request 36 to retrieve a certain class or package, e.g. a request to load "com.Foo". In FIG. 4, in the child-first delegation environment the child classloader first checks or asks 38 its own classfinder, to see if it has the requested class or package. In FIG. 5, if the child classloader cannot find the class or package in its own classfinder it sends a request 40 to the parent classloader to retrieve the class.

The above type of environment allows third-party classes to be loaded into the application, and since the entire classloader tree is reversed, and all the classes in the child classpath are always loaded by the child classloader, the environment does allow different applications to use differnet packages.

However, reversing or inverting the entire classloader tree brings with it another own set of problems. For example, classes that are loaded once already by the application or system classloaders may be loaded again. Furthermore, since classes are defined by its classloader and by name which ideintify a particular class, it is impossible to equate a class loaded, e.g., in a web application classloader with a class loaded in an application classloader. As soon as there is any interaction between the two branches (such as an EJB call from the web application) then there is a possibility of exception errors, and linkage errors (such as invoking a method on a class already loaded by the parent and passing a parameter class which is different from the one linked with the parent class). For the application developer, care must be taken when using the child-first hierarchy: in particular, linkage errors means it is difficult or impossible to create a new linkage at a later point in time—they must be consistent from the very start.

Figure 6:
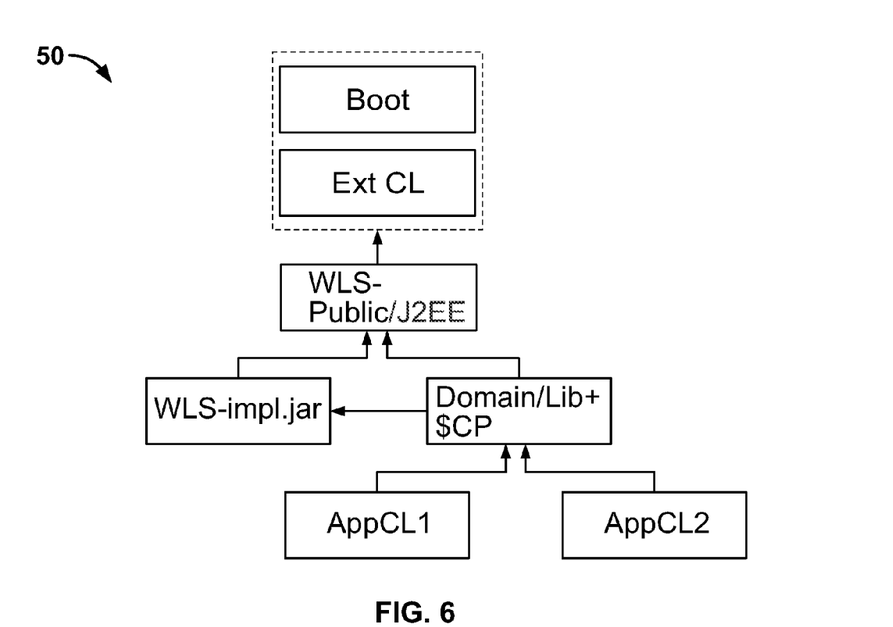
FIG. 6 shows another illustration of a classloader hierarchy that provides logical separation in accordance with an embodiment of the invention.

When all of the above factors are taken into consideration, another option would be to create a classloader hierarchy in which public classes are placed in a separate classloader that allows applications to access, and system-related classloaders are placed in a separate hierarchy. FIG. 6 shows an illustration of a classloader hierarchy 50 that provides such a logical separation. As shown in FIG. 6 the public classloader contains only public classes; while the server's own classloader contains its internally used classes along with all the various third-party JARs the server uses. In addition, the Domain/Lib classloader contains customer-specific third-party JARs; and all application classloaders are children of the Domain/Lib classloader. At first glance, this separation of public and private classloaders appears ideal. However, doing so prevents backward compatibility with previous implementations.

Filtering Classloader

In accordance with an embodiment of the present invention, a technique is provided that address each of the above problems, but also provides backward compatibility with previous implementations. In one embodiment, a filtering classloader is placed between two other classloaders, e.g. between the system classloader and the application classloader. The filtering classloader is provided with a set of patterns which throw a "class not found exception" if an application makes a request for that class or package. This exception can then be used by the system to select the correct classloader. For example, the filtering classloader may be provided with a filter pattern that specifies all "org.apache" classes. The filtering classloader matches all requests from the application classloader, and if any request matches this filter pattern then the filtering classloader throws an exception. The exception leads the application classloader to believe (perhaps correctly) that there is no class with that name in the system classloader. The application classloader then loads the class itself. It will be seen that the class may or may not exist in the system classloader; the filtering classloader in essence overrides any retrieval from that classloader in favor of the application classloader, for certain specified patterns of request.

Figure 7:
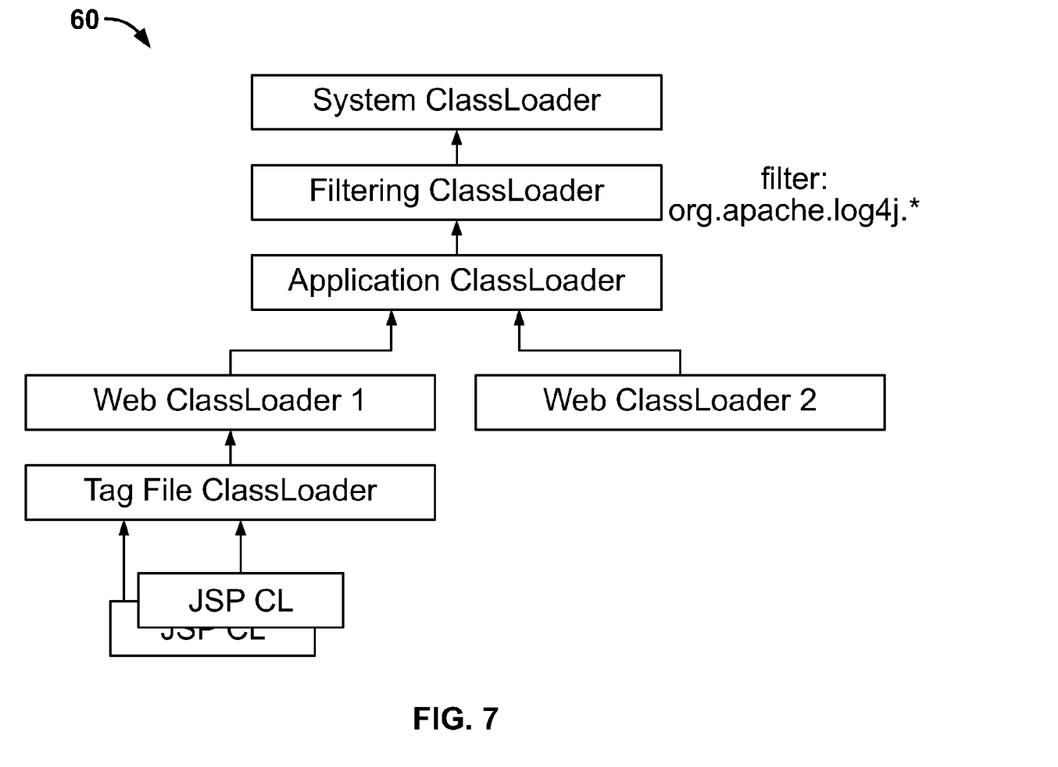
FIG. 7 shows an illustration of a filtering classloader in accordance with an embodiment of the invention.

FIGS. 7-18 show an illustration of a filtering classloader in accordance with an embodiment of the invention. As shown in FIG. 7, an embodiment of the filtering classloader environment 60 includes a filtering classloader between the system and application classloaders. The filtering classloader checks all requests against registered patterns. If the request is matched, the filtering classloader throws an exception and loads the class from the application classloader first, regardless of whether the system classloader has the class or not (i.e. in the example shown here, the org.foo class may actually be in both classloaders). If the request is not matched, the filtering classloader follows the traditional route of using the system classloader first, and then the application classloader. The filtering classloader environment 60 provides complete backward compatibility with J2EE standards.

Figure 8:
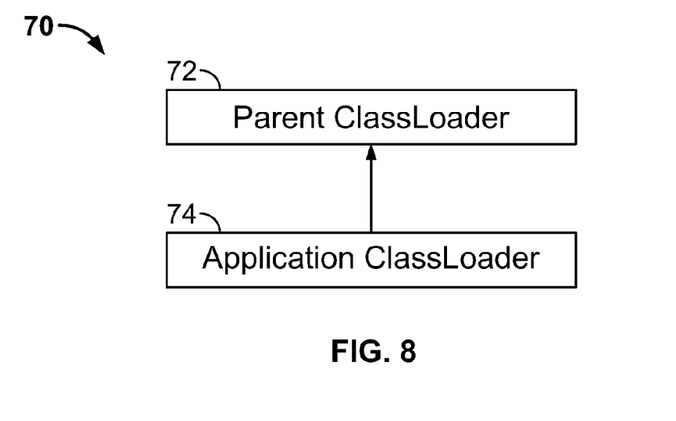
FIG. 8 shows another illustration of a filtering classloader in accordance with an embodiment of the invention.
Figure 9:
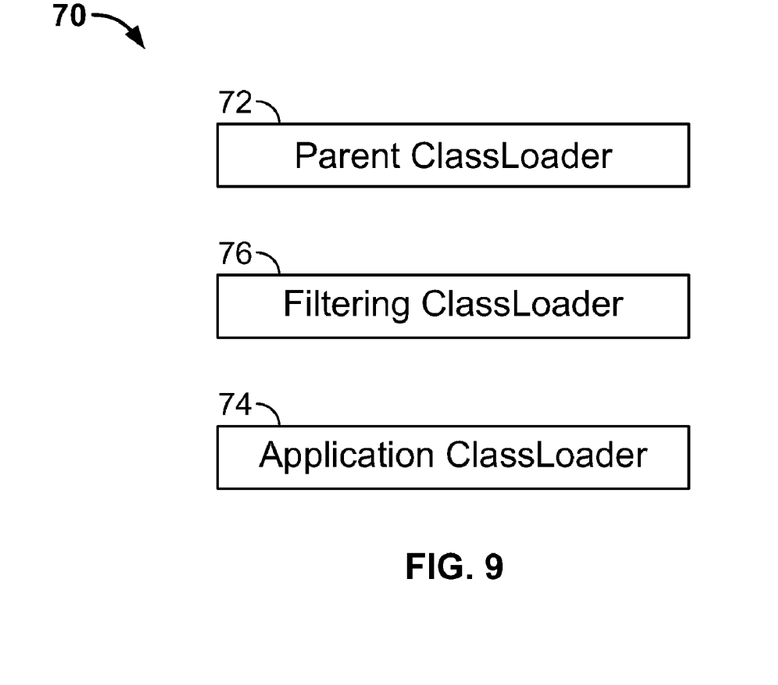
FIG. 9 shows another illustration of a filtering classloader in accordance with an embodiment of the invention.
Figure 10:
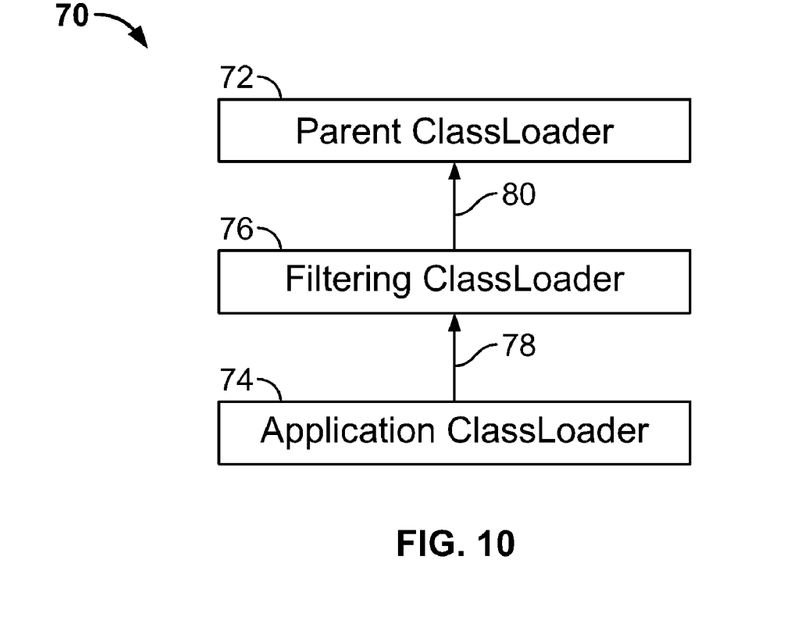
FIG. 10 shows another illustration of a filtering classloader in accordance with an embodiment of the invention.
Figure 11:
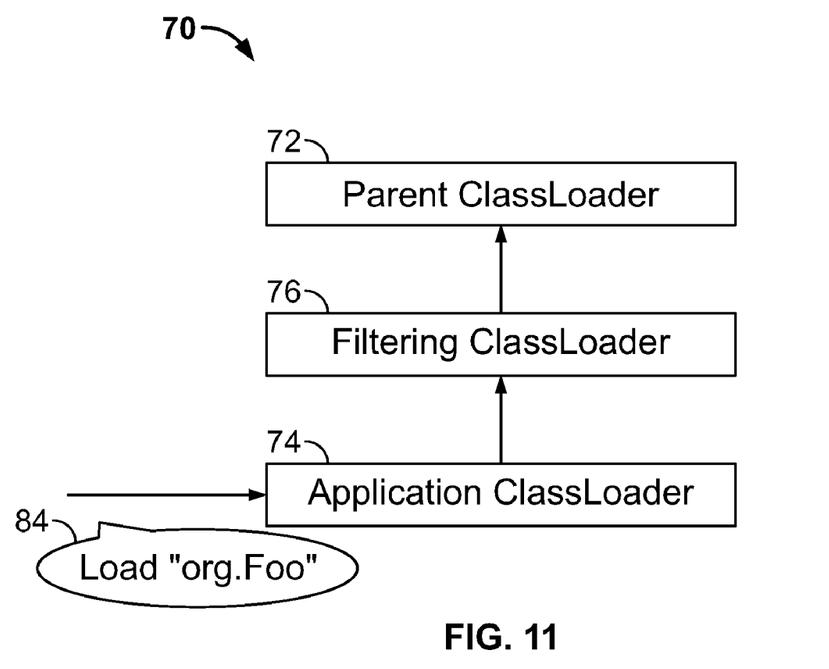
FIG. 11 shows another illustration of a filtering classloader in accordance with an embodiment of the invention.
Figure 12:
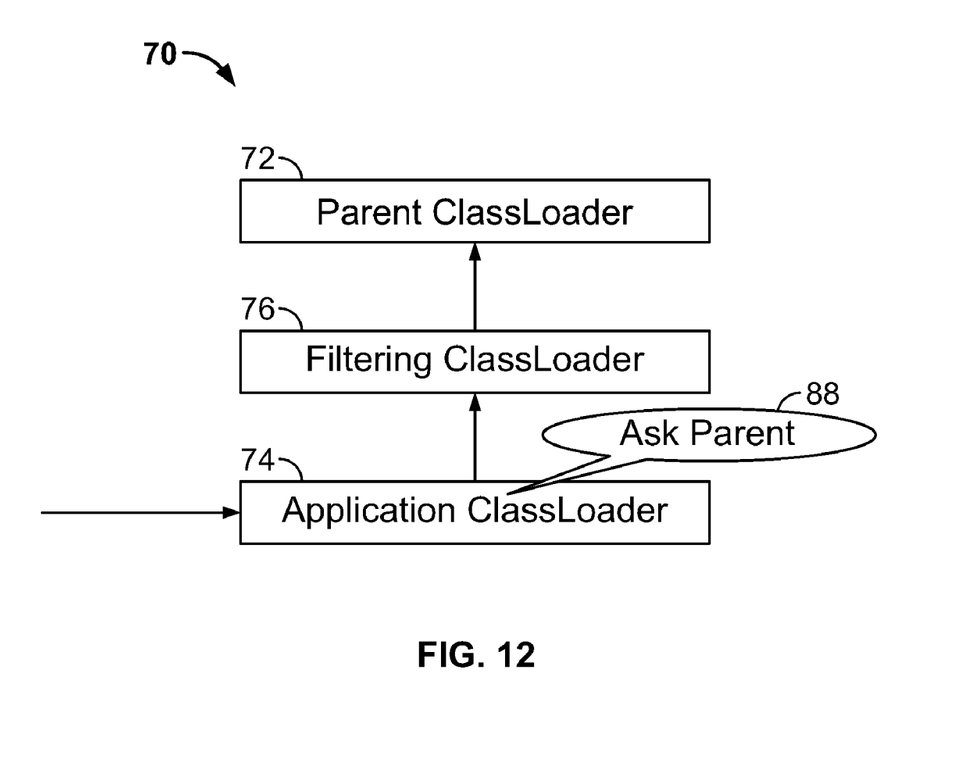
FIG. 12 shows another illustration of a filtering classloader in accordance with an embodiment of the invention.
Figure 13:
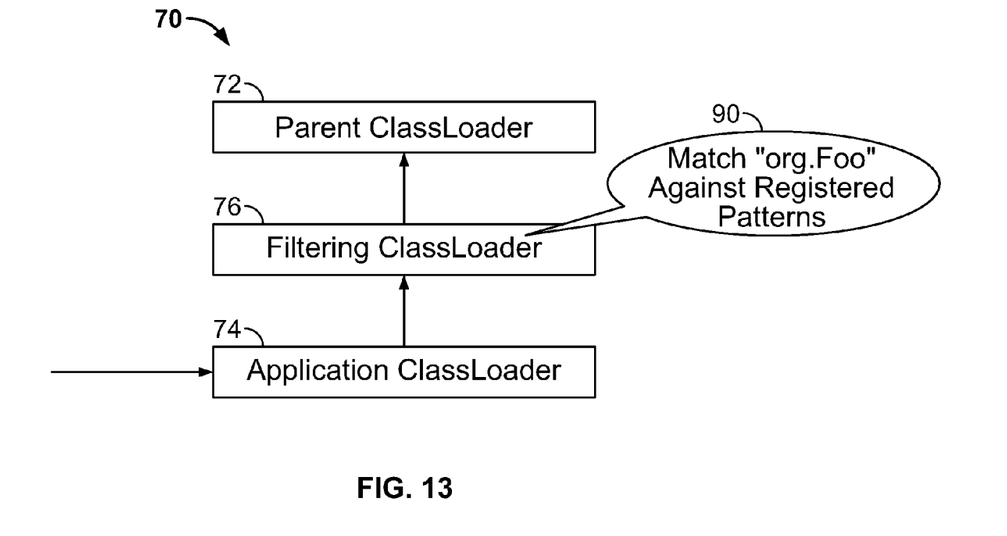
FIG. 13 shows another illustration of a filtering classloader in accordance with an embodiment of the invention.
Figure 14:
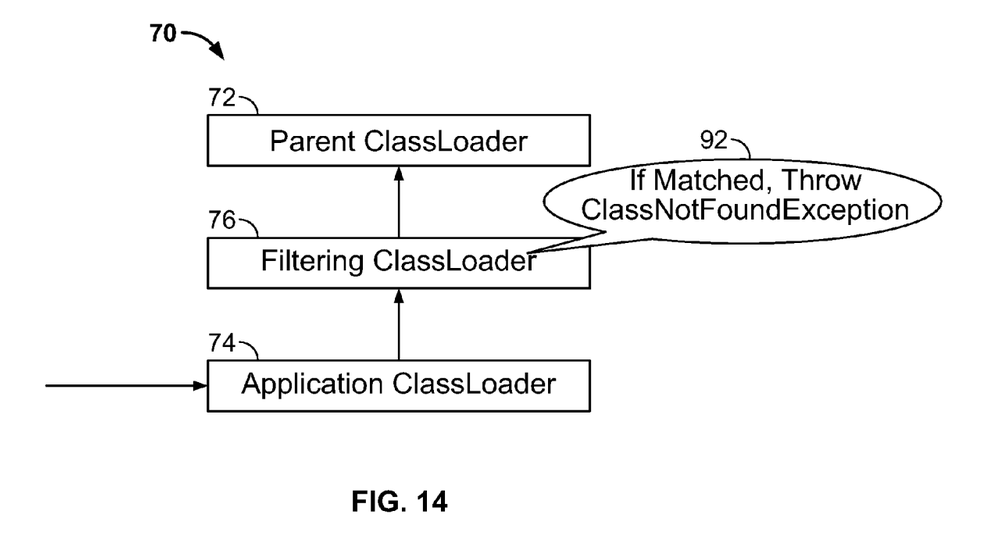
FIG. 14 shows another illustration of a filtering classloader in accordance with an embodiment of the invention.
Figure 15:
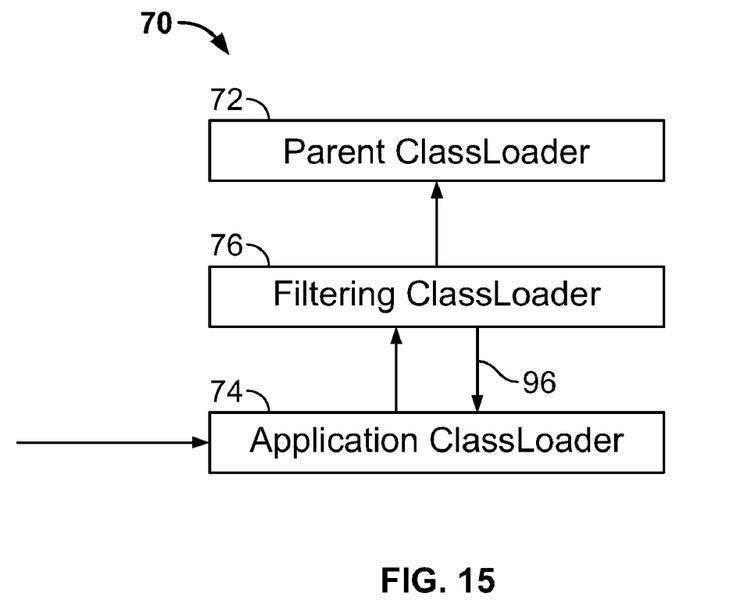
FIG. 15 shows another illustration of a filtering classloader in accordance with an embodiment of the invention.
Figure 16:
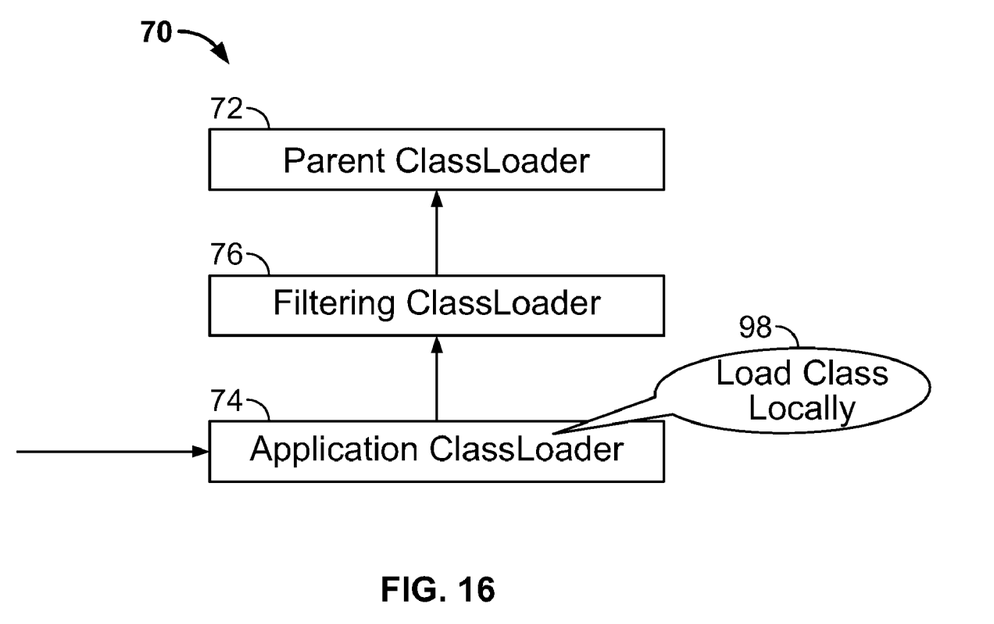
FIG. 16 shows another illustration of a filtering classloader in accordance with an embodiment of the invention.
Figure 17:
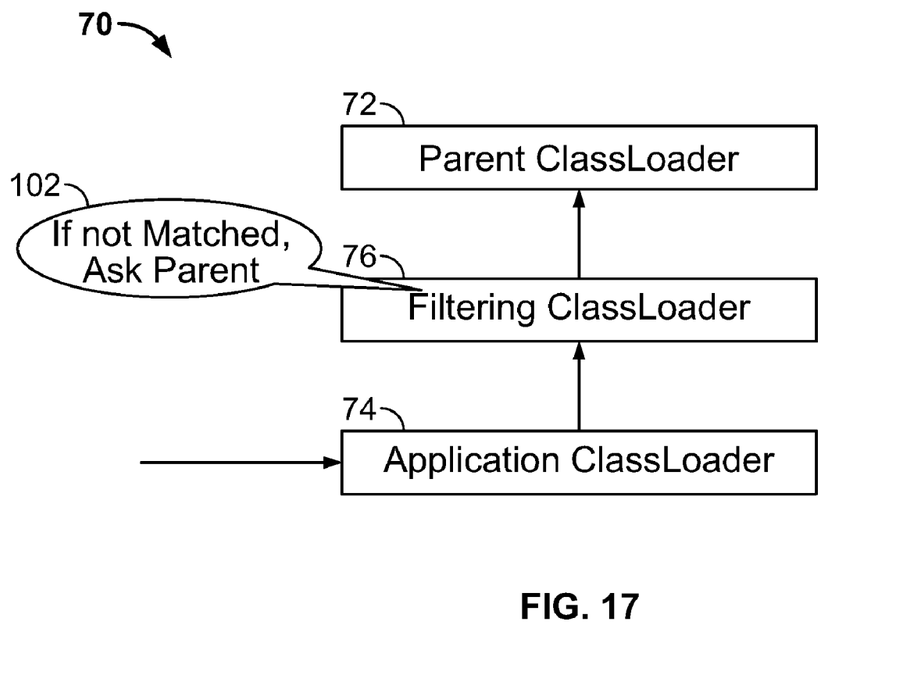
FIG. 17 shows another illustration of a filtering classloader in accordance with an embodiment of the invention.
Figure 18:
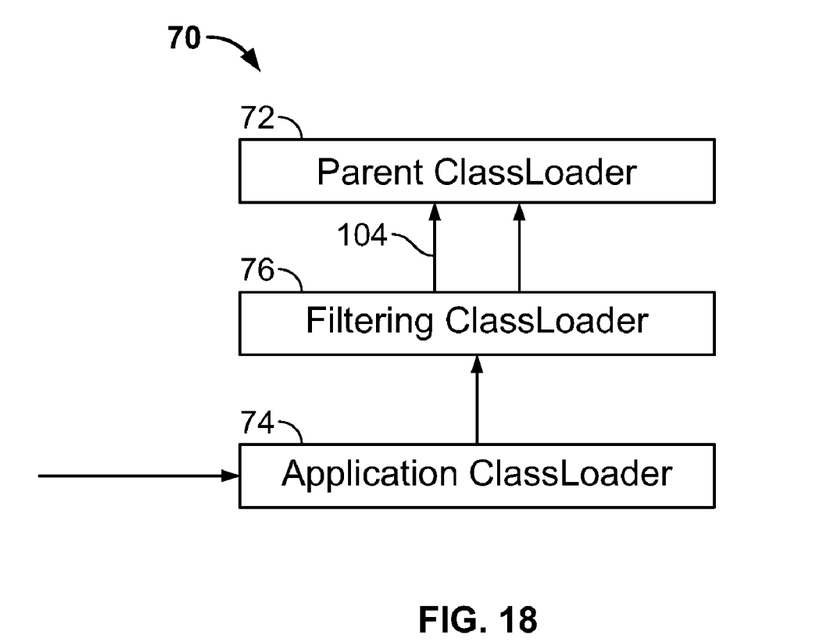
FIG. 18 shows another illustration of a filtering classloader in accordance with an embodiment of the invention.

As shown in FIG. 8, the filtering classloader environment 70 can be used with any two or more classloaders, e.g. a parent classloader 72 and an application classloader 74. In FIG. 9, the filtering classloader 76 is located between the other two classloaders and is configured to look for certain class or package patterns. In FIG. 10, the application classloader has the ability to communicate requests 78 to the filtering classloader, which in turn has the ability to communicate requests 80 to the parent classloader. In FIG. 11, the application classloader receives requests 82 from their application, e.g. a request to load "org.Foo". In FIG. 12, the application classloader is configured to ask its parent 88 for the class. In FIG. 13 the filtering classloader determines 90 whether the request matches the patterns configured in the filtering classloader. If there is a match then, in FIG. 14 the filtering classloader throws a "Class not found" exception 92. In FIG. 15, the request is delegated back 96 to the application classloader. In FIG. 16, the application classloader attempts to now load the class locally 98. If, as shown in FIG. 13 above, there is no pattern match at the filtering classloader, then in FIG. 17, the filtering classloader asks 102 it's parent (in this instance the parent classloader) for the requested class. In FIG. 18, the request 104 is communicated to the parent classloader.

The benefits of the above technique include that it lets the application developer choose which class version they will use with their application. Unlike traditional systems they are not forced to use the same classes in each application which are mandated by the system classloader. For example, a first application can use a first version of Xerxes, and a second application can use a second, different version of the Xerxes class, without requiring or abiding by any Xerxes versions specified by the system or by other applications. Although the possibilities of linkage errors are minimized, such errors are still possible if there is communication between the two applications that use the different versions of the class. Thus, application programmers must be careful to write their applications accordingly.

Resource Loading and Names

In accordance with an embodiment, resource loading is modified to allow the user to get to the resources to be loaded from a particular JAR. J2EE applications use certain naming classifications, which are normally retrieved from the system classloader. Since the above-described techniques allow the name to be retrieved from the application classloader instead (and then if necessary from the system classloader), when resources are provided in multiple locations, the filtering classloader allows resources of that same name to be selected from the application lever first. This allows for both J2EE compliance, and backward compatibility with pre-existing applications. There is no need to repackage the JARs for use with the new system, instead newly developed applications that work with the latest JARs can work and coexist with existing applications.

Filtering Process

Figure 19:
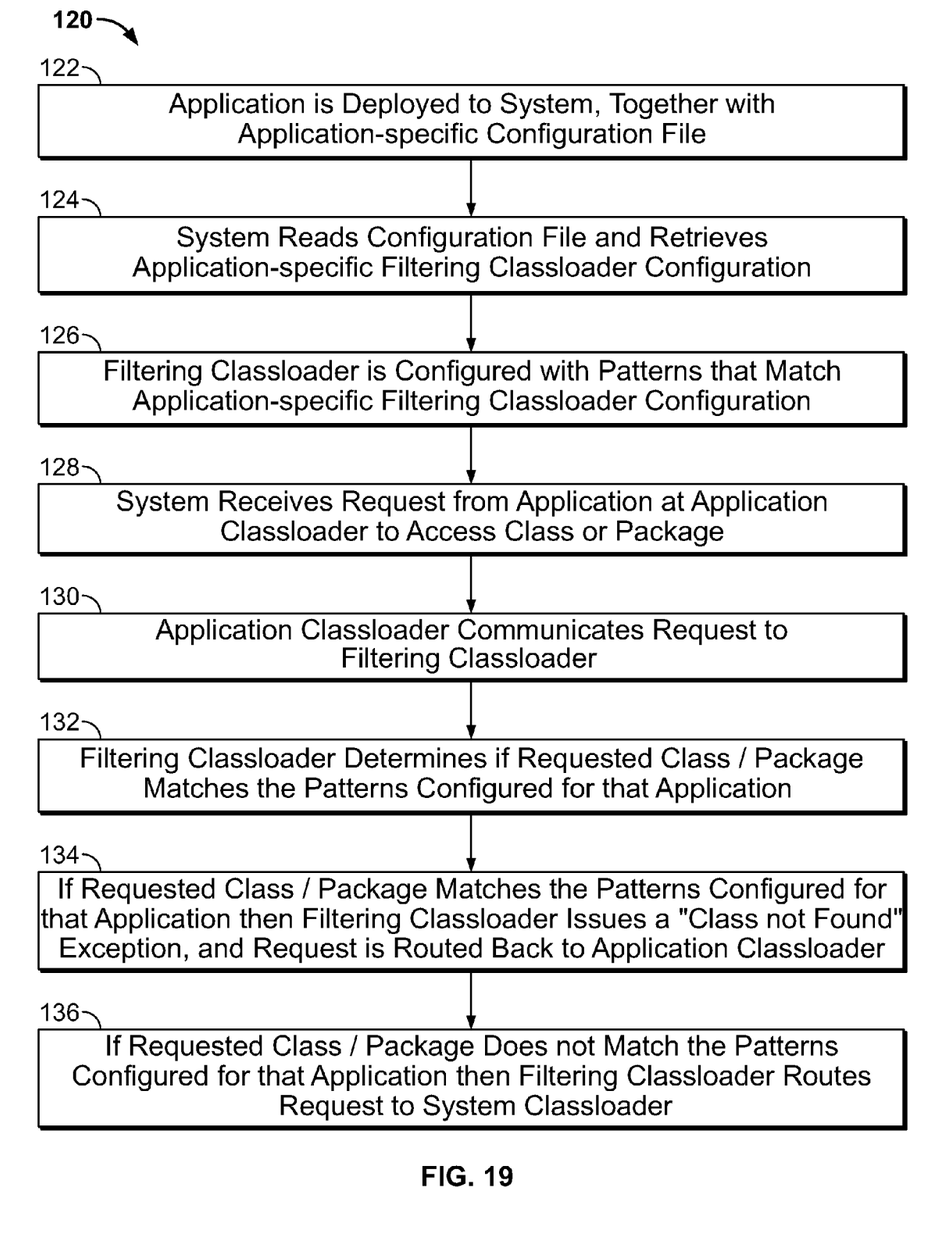
FIG. 19 shows a flowchart of a process for using a filtering classloader in accordance with an embodiment of the invention.

FIG. 19 shows a flowchart of a process 120 for using a filtering classloader in accordance with an embodiment of the invention. As shown in FIG. 19, in step 122 an application is deployed to system, together with an application-specific configuration file. In step 124, the system reads the configuration file and retrieves application-specific filtering classloader configuration. In step 126, the filtering classloader is configured with patterns that match application-specific filtering classloader configuration. In step 128, the system receives request from the application at the application classloader to access a class or package. In step 130, the application classloader communicates the request to the filtering classloader. In step 132, the filtering classloader determines if the requested class/package matches the patterns configured for that application. In step 134, if the requested class/package matches the patterns configured for that application then the filtering classloader issues a "class not found" exception, and the request is routed back to application classloader. Otherwise, in step 136, the filtering classloader routes request to the system classloader.

System Implementation

Figure 20:
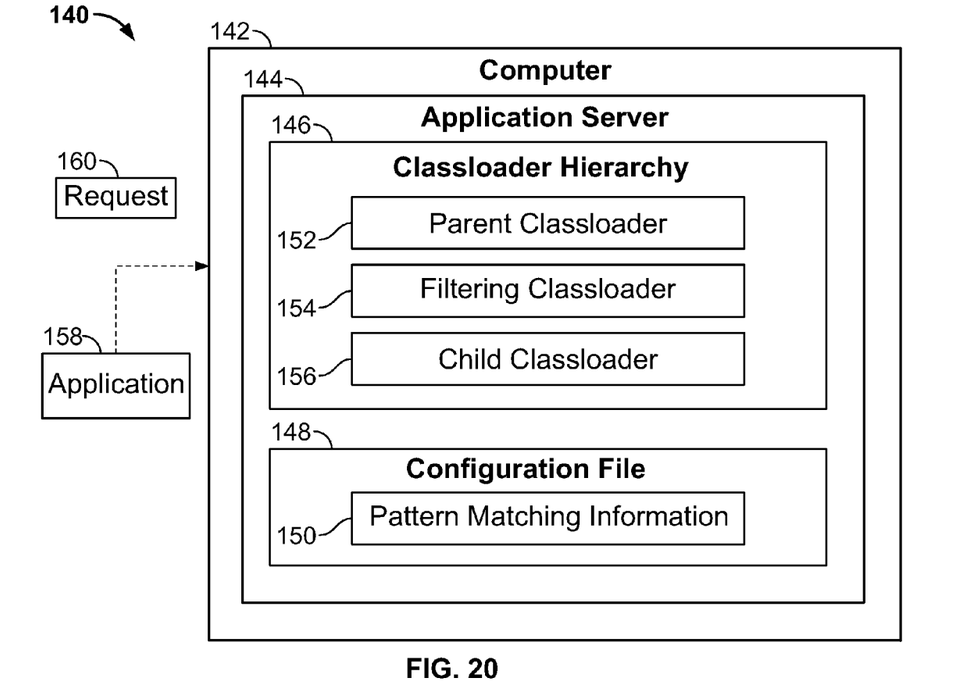
FIG. 20 shows an illustration of a system that includes a filtering classloader in accordance with an embodiment of the invention.

FIG. 20 shows an illustration of a system that includes a filtering classloader in accordance with an embodiment of the invention. As shown in FIG. 20, the system comprises a computer, microprocessor, or other processing device 142; with an application server, virtual machine, or other software environment 144 executing thereon. A configuration file 148 or another means is used to provide of classes or package pattern-matching information 150. The system further comprises a classloader hierarchy, including a parent classloader 152, child classloader 156, and filtering classloader 154, as described in further detail above. In accordance with an embodiment, the filtering classloader logically sits between two other classloaders, e.g. between the system classloader and the application classloader. The filtering classloader uses the patterns of classes and packages defined by the pattern-matching information, and throws a "class not found exception" when an application 158 makes a request 160 for that class or package. This exception leads the application classloader to believe (perhaps correctly) that there is no class with that name in the parent classloader (e.g., in the system classloader). The child classloader (e.g., the application classloader) then loads the class itself.

Configuration File

Figure 21:
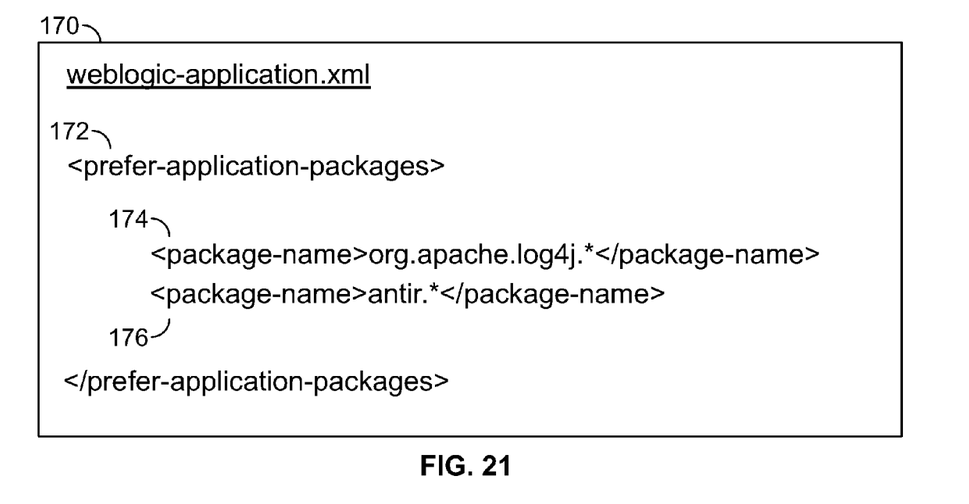
FIG. 21 shows an illustration of a filtering classloader configuration statement in accordance with an embodiment of the invention.

FIG. 21 shows an illustration of a filtering classloader configuration 170 in accordance with an embodiment of the invention. In accordance with an embodiment the pattern matching information is saved in a configuration file, and uses a "prefer" or similar keyword 172 to indicate that for that package 174, 176, it is preferred to use the application level package rather than the one specified by the system classloader. In accordance with an embodiment, the filtering classloader patterns can be configured in the deployment description information, e.g. in a weblogic-application.xml file, or another type of file. At deployment time the filtering classloader is created and populated with the list of patterns. In accordance with an embodiment the filtering classloader is lightweight and doesn't actually load anything, other than provide pattern matching.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMS, RAMs, EPROMS, EEPROMS, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic environment, other application servers, virtual machines, computing environments, and software development systems may use and benefit from the invention. Similarly, while the examples described herein illustrate how the features may be used in a system-application-level classloader hierarchy, it will be evident that the system, process, and techniques can be used with other types and levels of classloaders. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a filtering classloader within a Java-based or other application environment, comprising:
   a processor;
   a classloader hierarchy for use by applications, including
      one or more child classloaders, which are configured to receive requests from the applications to access classes and packages,
      a parent classloader, and
      a filtering classloader that is located within the classloader hierarchy between the one or more child classloaders and the parent classloader, and acts as a parent to the one or more child classloaders;
   wherein the filtering classloader includes a class pattern matching information which defines those classes and packages for which it is preferred to use a child level class or package rather than a class or package specified by a parent classloader; and
   wherein upon receiving a request from a child classloader to access a particular class or package, the filtering classloader
      matches the request against the class pattern matching information, and
      if it is determined there is a match to one of those classes and packages defined therein, overrides a class loading operation to cause the requested class or package to be retrieved locally at the child classloader rather than from the parent classloader.

2. The system of claim 1, wherein the parent classloader includes the class or package requested and wherein the filtering classloader overrides the request from being communicated to the parent classloader, and instead retrieves the class or package locally from the child classloader.

3. The system of claim 1, wherein the child classloader is an application classloader and the parent classloader is a system classloader.

4. The system of claim 1, wherein the class pattern matching information is provided as a configuration file.

5. The system of claim 4, wherein the configuration is parsed during deployment of an application to configure class pattern matching information for that particular application, and wherein a first application can use a first version of a particular class or package, and a second application can use a second, different version of the particular class or package.

6. The system of claim 1, wherein the parent classloader is a system classloader, and wherein the classloader hierarchy includes a plurality of child classloaders, and wherein each child classloader is an application classloader, and wherein the filtering classloader is located within the classloader hierarchy between the system classloader and the plurality of application classloaders.

7. The system of claim 1, wherein the filtering classloader overrides the class loading operation to cause the requested class or package to be retrieved locally at the child classloader rather than from the parent classloader by throwing a class not found exception.

8. A method for providing a filtering classloader within a Java-based or other application environment, comprising the steps of:
provide a classloader hierarchy for use by applications, including
one or more child classloaders, which are configured to receive requests from the applications to access classes and packages;
a parent classloader, and
a filtering classloader that is located within the classloader hierarchy between the one or more child classloaders and the parent classloader, and acts as a parent to the one or more child classloaders;
wherein the filtering classloader includes a class pattern matching information which defines those classes and packages for which it is preferred to use a child level class or package rather than a class or package specified by a parent classloader; and
upon receiving a request from a child classloader to access a particular class or package,
matching, at the filtering classloader, the request against the class pattern matching information, and
if it is determined there is a match to one of those classes and packages defined therein, overriding a class loading operation to cause the requested class or package to be retrieved locally at the child classloader rather than from the parent classloader.

9. The method of claim 8, wherein the parent classloader includes the class or package requested and wherein the filtering classloader overrides the request from being communicated to the parent classloader, and instead retrieves the class or package locally from the child classloader.

10. The method of claim 9, wherein the child classloader is an application classloader and the parent classloader is a system classloader.

11. The method of claim 9, wherein the class pattern matching information is provided as a configuration file.

12. The method of claim 11, wherein the configuration is parsed during deployment of an application to configure class pattern matching information for that particular application, and wherein a first application can use a first version of a particular class or package, and a second application can use a second, different version of the particular class or package.

13. The method of claim 9, wherein the parent classloader is a system classloader, and wherein the classloader hierarchy includes a plurality of child classloaders, and wherein each child classloader is an application classloader, and wherein the filtering classloader is located within the classloader hierarchy between the system classloader and the plurality of application classloaders.

14. The method of claim 9, wherein the filtering classloader overrides the class loading operation to cause the requested class or package to be retrieved locally at the child classloader rather than from the parent classloader by throwing a class not found exception.

15. A computer readable storage medium, including instructions stored thereon which when executed cause a computer to perform the steps of:
providing a classloader hierarchy for use by applications, including
one or more child classloaders, which are configured to receive requests from the applications to access classes and packages,
a parent classloader, and
a filtering classloader that is located within the classloader hierarchy between the one or more child classloaders and the parent classloader, and acts as a parent to the one or more child classloaders;
wherein the filtering classloader includes a class pattern matching information which defines those classes and packages for which it is preferred to use a child level class or package rather than a class or package specified by a parent classloader; and
upon receiving a request from a child classloader to access a particular class or package,
matching, at the filtering classloader, the request against the class pattern matching information, and
if it is determined there is a match to one of those classes and packages defined therein, overriding a class loading operation to cause the requested class or package to be retrieved locally at the child classloader rather than from the parent classloader.

16. The computer readable storage medium of claim 15, wherein the parent classloader includes the class or package requested and wherein the filtering classloader overrides the request from being communicated to the parent classloader, and instead retrieves the class or package locally from the child classloader.

17. The computer readable storage medium of claim 15, wherein the child classloader is an application classloader and the parent classloader is a system classloader.

18. The computer readable storage medium of claim 15, wherein the class pattern matching information is provided as a configuration file.

19. The computer readable storage medium of claim 18, wherein the configuration is parsed during deployment of an application to configure class pattern matching information for that particular application, and wherein a first application can use a first version of a particular class or package, and a second application can use a second, different version of the particular class or package.

20. The computer readable storage medium of claim 15, wherein the parent classloader is a system classloader, and wherein the classloader hierarchy includes a plurality of child classloaders, and wherein each child classloader is an application classloader, and wherein the filtering classloader is located within the classloader hierarchy between the system classloader and the plurality of application classloaders; and wherein the filtering classloader overrides the class loading operation to cause the requested class or package to be retrieved locally at the child classloader rather than from the parent classloader by throwing a class not found exception.

* * * * *

UNITED STATES PATENT AND TRADEMARK OFFICE
CERTIFICATE OF CORRECTION

PATENT NO.        : 8,196,128 B2            Page 1 of 1
APPLICATION NO.   : 11/765263
DATED             : June 5, 2012
INVENTOR(S)       : Susarla et al.

It is certified that error appears in the above-identified patent and that said Letters Patent is hereby corrected as shown below:

In column 4, line 57, delete "differnet" and insert -- different --, therefor.

In column 4, line 64, delete "ideintify" and insert -- identify --, therefor.

In column 7, line 58, delete "ROMS," and insert -- ROMs, --, therefor.

In column 7, line 58, delete "EPROMS, EEPROMS," and insert -- EPROMs, EEPROMs, --, therefor.

In column 9, line 17, in Claim 8, delete "packages;" and insert -- packages, --, therefor.

Signed and Sealed this
Thirtieth Day of October, 2012

David J. Kappos
*Director of the United States Patent and Trademark Office*